United States Patent [19]

Brandenburg et al.

[11] 4,372,940

[45] Feb. 8, 1983

[54] PROCESS AND APPARATUS FOR TREATMENT OF THIOSULFATE CONTAINING LIQUORS

[75] Inventors: Bruce L. Brandenburg, Wausau; Gerald L. Bauer, Rothschild, both of Wis.

[73] Assignee: Sterling Drug Inc., New York, N.Y.

[21] Appl. No.: 314,860

[22] Filed: Oct. 26, 1981

[51] Int. Cl.$^3$ ............................................. C01B 17/02
[52] U.S. Cl. ................................ 423/567 A; 423/551; 210/761
[58] Field of Search .................. 423/551, 567, 571; 210/758, 761

[56] References Cited

U.S. PATENT DOCUMENTS

| | | | |
|---|---|---|---|
| 3,558,272 | 1/1971 | Urban | 423/571 |
| 3,627,676 | 12/1971 | Eccles | 423/551 X |
| 3,672,836 | 6/1972 | Brown | 423/571 |
| 3,728,439 | 4/1973 | Urban | 423/567 |
| 3,761,409 | 8/1973 | McCoy et al. | 210/761 |
| 3,855,390 | 12/1974 | Matumoto et al. | |

FOREIGN PATENT DOCUMENTS

| | | | |
|---|---|---|---|
| 50-119791 | 9/1975 | Japan | 423/551 |
| 52-1712 | 1/1977 | Japan . | |

Primary Examiner—G. O. Peters
Attorney, Agent, or Firm—Allen H. Erickson; Thomas L. Johnson; B. Woodrow Wyatt

[57] ABSTRACT

A process and apparatus for treating thiosulfate containing liquors such as coke oven gas scrubbing liquors in two stages of wet oxidation with intermediate removal of elemental sulfur. Mild oxidation conditions in the first stage results in conversion of thiosulfate sulfur to elemental sulfur, which is removed prior to second stage wet oxidation of the liquors to substantially reduce the liquor oxygen demand.

14 Claims, 9 Drawing Figures

PROCESS AND APPARATUS FOR TREATMENT OF THIOSULFATE CONTAINING LIQUORS

BACKGROUND OF THE INVENTION

1. Field of the Invention

This invention relates to an improvement in treatment of thiosulfate containing liquors by wet oxidation.

2. Description of the Prior Art

The treatment of coke oven gas (COG) scrubbing liquors by wet oxidation is common in Japan and is becoming known in the U.S. and Canada. Coke oven gas scrubbing liquors typically contain ammonium thiocyanate, ammonium thiosulfate, ammonia, elemental sulfur, and same organics. The liquors may also contain small amounts of hydrogen sulfide and hydrogen cyanide. The average analyses of seven different COG liquors were as follows:

| | |
|---|---|
| NH4SCN | 60 g/l |
| (NH4)2S2O3 | 65 g/l |
| NH3 | 3 g/l |
| Elemental S | 4 g/l |
| Total COD | 85 g/l |
| pH | 6-8 |

In conventional wet oxidation practice, the scrubbing liquor is pumped by a high pressure pump through a heat exchanger where the liquor is preheated, to a reactor where the oxidation takes place. Compressed air is mixed with the liquor before the liquor enters the heat exchanger, or alternately prior to entering the reactor. The heat of reaction released in the reactor raises the temperature from the inlet temperature at the reactor bottom to the outlet temperature at the top of the reactor. From the top of the reactor the oxidized liquor and exhaust vapors are conveyed back through the heat exchanger and out of the system through a pressure control valve. Conventional wet oxidation of COG scrubbing liquors is normally carried out at temperatures from 230° C. to 300° C. and at pressures from 500 pounds per square inch to about 2000 pounds per square inch (35 to 140 atmospheres).

Wet oxidation of COG scrubbing liquors is shown, for example in U.S. Pat. No. 3,855,390 to Matumoto et. al., in which thiocyanates are oxidized to sulfates. Lime or limestone is added to the liquors prior to wet oxidation to avoid corrosion of the reactor by sulfuric acid. Free sulfur initially present in the scrubbing liquors is removed by filtration prior to wet oxidation.

In Japanese Patent Publication No. 1712, Jan. 17, 1977 of Nomoto et. al., improved yield and purity of ammonium sulfate are claimed in wet oxidation of COG scrubbing liquors followed by gas-solid separation, evaporation and recycle of the small liquid stream.

Difficulties with conventional wet oxidation arise with the decomposition of thiosulfate which occurs during the oxidation process. When the waste scrubber liquor is mixed with air and heated to even moderate temperatures, 150° C. or higher, the ammonium thiosulfate begins to oxidize by the following mechanism:

$$(NH_4)_2S_2O_3 + H_2O + 2O_2 \rightarrow (NH_4)_2SO_4 + H_2SO_4$$

One mole of sulfuric acid is formed from each mole of ammonium thiosulfate contained in the feed. After enough sulfuric acid is formed to neutralize the excess ammonia originally contained in the liquor the pH rapidly drops to 3.0 or lower and the thiosulfate remaining unoxidized rapidly decomposes by the following reaction to give sulfite and elemental sulfur:

$$S_2O_3^- + H^+ \rightarrow HSO_3^- + S$$

For a waste scrubber liquor with a composition the same as shown above as much as 7.5 to 11.2 grams per liter of sulfur could be formed at the beginning of the oxidation process.

Elemental sulfur is very resistant to oxidation, and even at oxidation temperatures of 230° to 290° C., all sulfur will not be oxidized from the waste liquor. Small amounts of sulfur in the feed, 4 grams per liter, can usually be handled in the wet oxidation systems. Some will oxidize and the remainder is carried out with the effluent as small suspended particles.

Larger amounts of elemental sulfur that result from decomposition of thiosulfate causes problems for wet oxidation reactors. One reactor with 20 g/l elemental sulfur in the feed was found to have completely filled up with liquid sulfur. In other cases the sulfur, a liquid at reactor temperature, solidified on the surfaces of the heat exchangers causing blockage and loss of heat transfer efficiency. Sulfur has also been observed to solidify on the inner surfaces of the pressure control valve leading to blockage of flow.

Another undesirable affect of large amounts of elemental sulfur in a wet oxidation unit is that the acid formed in even a partial oxidation must be diluted with water to prevent corrosion of the wet oxidation unit. The dilution water increases pipe sizes and heat exchanger requirements and thus increases the cost of the wet oxidation system.

SUMMARY OF THE INVENTION

The present invention comprises wet oxidation of thiosulfate containing waste aqueous liquors in two stages with an intermediate sulfur removal step. In the first stage of wet oxidation, oxidation is carried out at a temperature sufficient to oxidize a portion of the thiosulfate to sulfuric acid and sulfate and to decompose the remaining thiosulfate to sulfite and elemental sulfur. After the first oxidation stage all or much of the sulfur generated by decomposition of thiosulfate and all or much of the sulfur originally present in the liquor is separated from the wet oxidized liquors and continuously or intermittently removed from the system in either a solid or molten form. The partially oxidized liquors then flow to the second stage of wet oxidation where the temperature is sufficiently high to achieve substantial destruction of sulfur, organic matter, and other oxidizable substances remaining in the liquors. The amount of sulfur contained in the liquor as it flows to the second wet oxidation stage is preferably less than or equal to about 4 g/l, which can be handled in the conventional wet oxidation system without plugging of control valves or heat exchangers. Both wet oxidation stages may be incorporated into a single pressure vessel, or separate reactor vessels may be utilized.

Elemental sulfur is discharged in solid or molten form from the first reactor, a separator following the first reactor, or the first stage of a multistage reactor.

Oxygen, air or oxygen-containing gas is added to each stage of wet oxidation and offgases from the first stage of wet oxidation are preferably separated and discharged from the oxidized liquors following the first stage of wet oxidation.

The advantages of this invention are numerous. The chance that the reactor will be filled up with sulfur is eliminated. The problem of sulfur solidifying on the heat exchanger or pressure control valve surfaces is eliminated. The need for dilution water that would increase the plant size is reduced or eliminated. A large portion of the liquor chemical oxygen demand is removed in the first stage, reducing the total oxygen requirement. A relatively pure, very handleable sulfur product is produced instead of the dilute sulfuric acid solution produced by conventional wet oxidation plants. In applications where sulfate salt is not recovered, the reduced quantity of sulfuric acid requiring neutralization is economically advantageous. Also, while complete oxidation of elemental sulfur requires high temperatures, removing the sulfur according to this invention may allow the second oxidation stage to operate at less severe conditions than is possible in conventional single stage wet oxidation units. The potential for corrosion is diminished. Capital and operating costs are reduced.

DESCRIPTION OF THE PREFERRED EMBODIMENT

Figure 1:
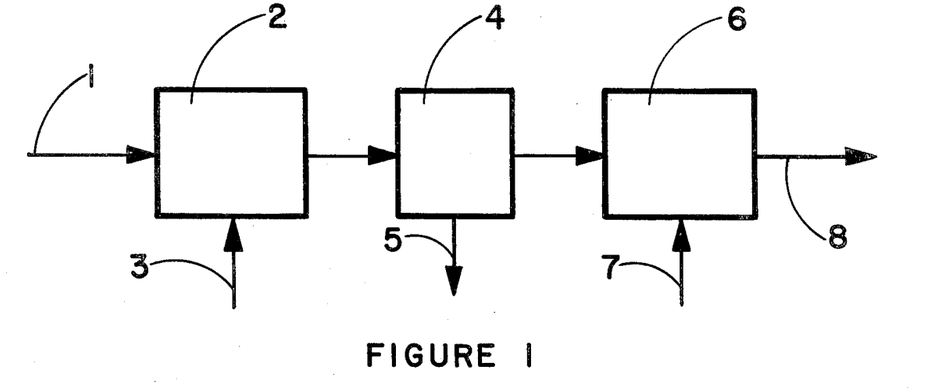
FIG. 1 is a general schematic showing the three basic steps of the present invention.

Referring now to FIG. 1 which illustrates the broad concept of this invention, thiosulfate containing liquor 1 is subjected to a wet oxidation step 2 at 50° to 200° C. wherein oxygen, air, or other oxygen containing gas 3 oxidizes a portion of the thiosulfate to sulfate. A further portion decomposes to sulfite and elemental sulfur, and the latter is separated from the liquor by gravity, concentrated in step 4 and substantially removed as solid or molten sulfur 5. The remaining liquor is subjected to a second wet oxidation step 6 at a higher temperature than the first wet oxidation step. Oxygen, air, or other oxygen containing gas 7 is introduced into the second wet oxidation step, and oxidized liquor 8 is discharged from the process.

Figure 2:
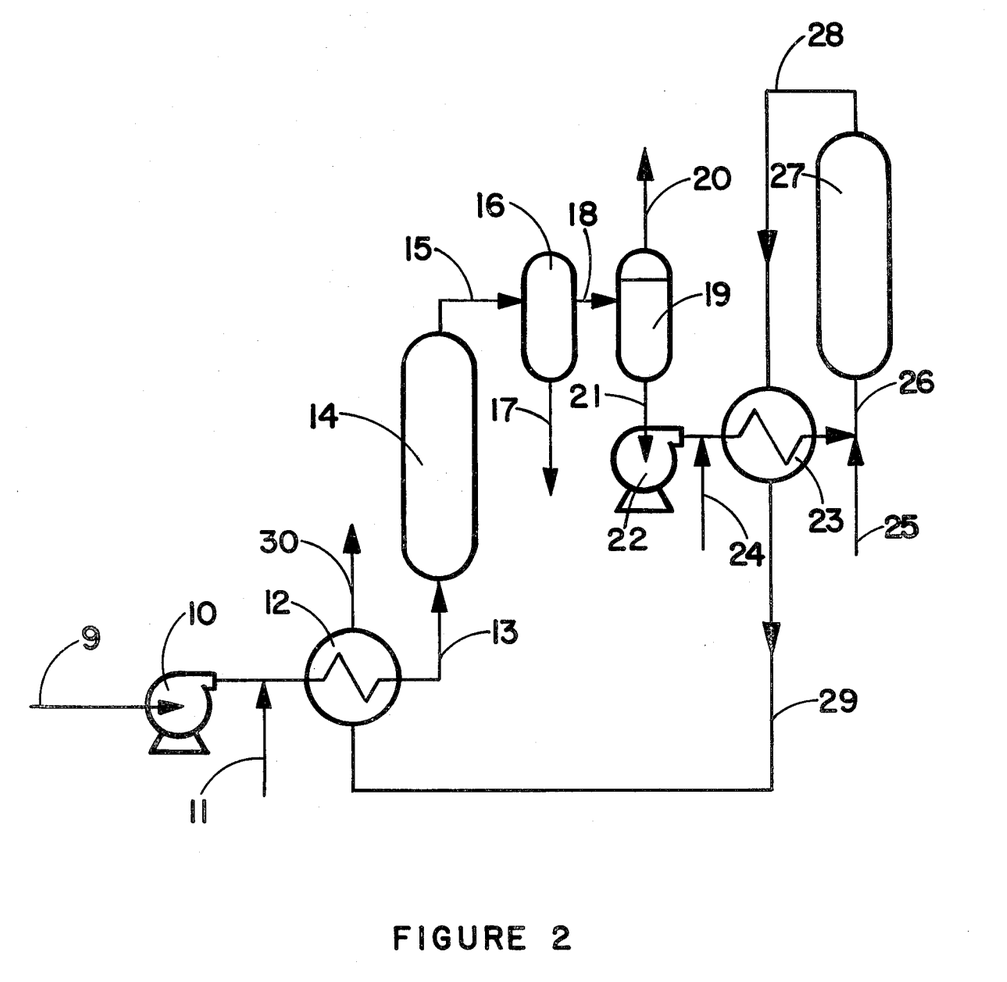
FIG. 2 is a more detailed flow schematic of one embodiment of the present invention where elemental sulfur is removed in solid form.
Figure 3:
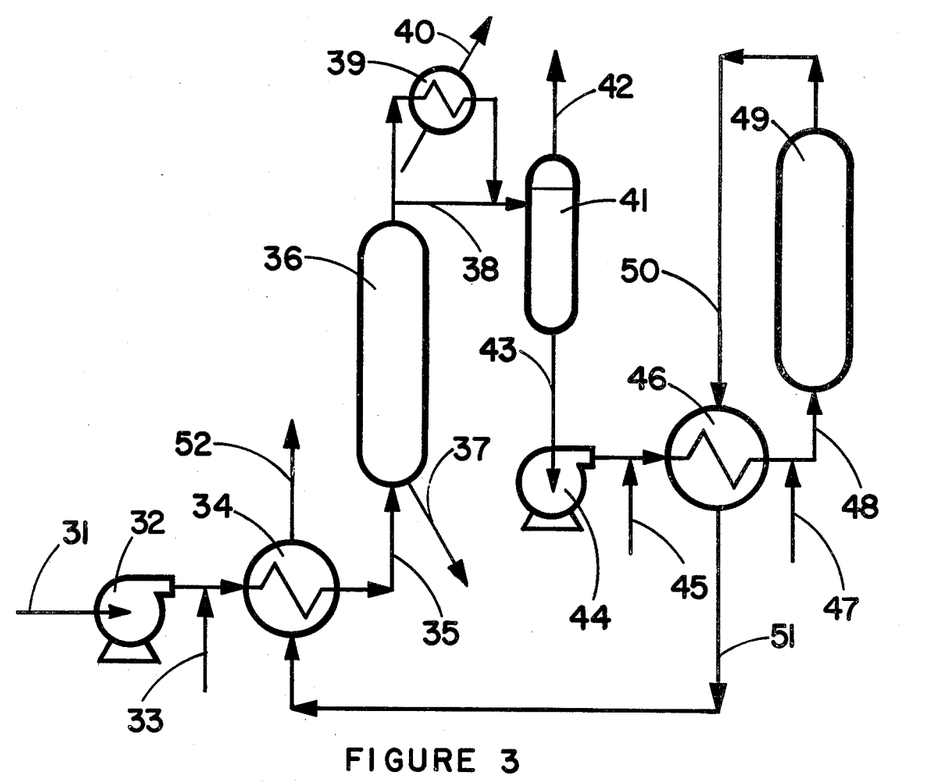
FIG. 3 is a flow schematic of another embodiment in which elemental sulfur is removed in a molten state.

Elemental sulfur may be removed as solid particles illustrated in FIG. 2 or alternatively in a molten state as for example in FIG. 3.

In the embodiment of FIG. 2, thiosulfate containing liquor 9 is transported by pump 10 to first heat exchanger 12 where the liquor and added oxygen, air, or other oxygen containing gas 11 are together preheated by hot oxidized liquor 29. The preheated liquor-gas mixture 13 is then wet oxidized in reactor 14 at a temperature below the melting point of sulfur. The accepted melting point for rhombic sulfur is 112.8° C.; after melting at temperatures below 119.25° C., sulfur crystallizes to the monoclinic form having the higher melting point. Typically this first wet oxidation is carried out at 50° to 110° C. and a portion of the thiosulfates is oxidized to sulfuric acid and sulfate, and remaining thiosulfates are thereby decomposed, releasing elemental sulfur and sulfite. The three-phase mixture 15 of liquor, gases and solid sulfur passes from the reactor to a separation device 16 where solid particles 17 of sulfur are removed. The remaining mixture 18 passes to a gas-liquid separator 19 from which gases 20 are discharged. In an alternate arrangement, a single separator suffices to separate the solid sulfur phase 17 and the reaction gases 20 from the liquor, discharging them in separate streams. In some cases the sulfur may be concentrated and discharged in a separate stream from the reactor 14.

Complete wet oxidation of most organic compounds found in liquors from COG and similar processes requires temperatures in excess of 175° C. Furthermore, when liquor from the first reactor contains elemental sulfur which is to be wet oxidized, temperatures of 230° C. or higher may be required.

In the embodiment of FIG. 2, partially oxidized liquor 21 is pressurized by pump 22 and heated further by heat exchanger 23 before subjection to a second more severe wet oxidation in second stage reactor 27. Air, oxygen, or oxygen containing gas 24 or 25 is injected into the liquor either before or after the liquor is heated in second heat exchanger 23, and the resulting mixture 26 is wet oxidized in second stage reactor 27 to destroy a major portion of the remaining oxidizable matter and sulfur in the liquor. The reactor temperature is maintained at 175° to 325° C. by the heat of reaction. The mixture 28 of wet oxidized liquor and gas from the second stage reactor 27 is cooled by heat exchange in heat exchangers 23 and 12 with liquor or liquor-gas mixture entering each wet oxidation stage. The mixture 30 of cooled wet oxidation liquor and gas is then separated into liquid and gas streams prior to discharge, reuse or further treatment.

Figure 5:
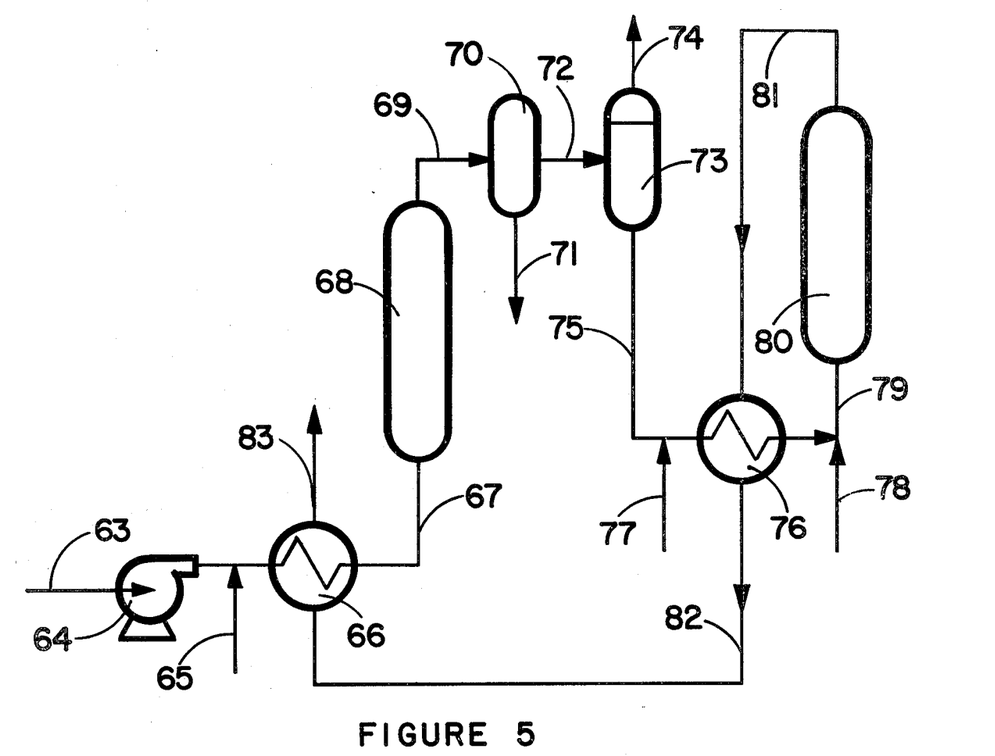
FIG. 5 shows an embodiment wherein the first reactor is operated at a slightly higher pressure than the second reactor, and only one high pressure pump is required to pump the liquor.

Alternatively, as shown in FIG. 5 gas-liquid separation may be performed before passage through heat exchanger 66 or both heat exchangers, and the liquid stream only is used to preheat incoming liquor 63 and partially oxidized liquor 75.

Differences in liquor composition and/or desired oxidation level will necessitate different heat transfer capabilities in the first and second heat exchangers, or even elimination of the second exchanger in certain situations. In other cases it may be necessary to add steam or other source of heat, or alternately, cooling may be provided to maintain the desired reactor temperatures.

The system pressures are maintained at a level where a major portion of the water in the liquor remains in the liquid state. The temperature of the second reactor 27 is higher than that of the first reactor 14 and therefore requires a higher minimum pressure. Typically, the first reactor may be maintained at 0–100 psig (1–8 Atm.) and the second reactor at 500–2000 psig. (35–137 Atm.). In some cases the second pump 22 may be eliminated and pump 10 operated at the higher pressure. In this case the first reactor is operated at a slightly higher pressure than the second reactor.

In the further embodiment of FIG. 3, thiosulfate containing liquor 31 is pumped by first pump 32 to heat exchanger 34 where together with added oxygen, air, or other oxygen containing gas 33, said liquor is preheated. The gas-liquor mixture 35 is subjected to wet oxidation conditions in first reactor 36 at a temperature greater than the melting point of sulfur. The temperature of this step may range from about 120° C. to 200° C. A portion of the thiosulfates is oxidized to sulfuric acid and sulfate and the remaining thiosulfates decompose to sulfite and elemental sulfur, and the latter is removed from the bottom of reactor 36 as molten sulfur 37. Alternatively, reactor 36 may be designed to be highly mixed, preventing gravity settling of the sulfur, and a separate step of quiescent settling and sulfur removal follows the first wet oxidation step.

In the process according to FIG. 3, the mixture 38 of partially oxidized liquor having most of the elemental sulfur removed therefrom and accompanying gases are passed to separation device 41. Gases 42 are discharged and the liquor 43 is pumped by pump 44 to a second, more severe wet oxidation step. Before entering second reactor 49, liquor 43 is preheated in heat exchanger 46 by heat exchange with hot reactor effluent 50. Oxygen, air, or other oxygen bearing gas 45 or 47 is injected into the liquor before or following the preheating step. A major portion of the remaining organic matter, sulfur, and other oxidizable compounds is destroyed by this second wet oxidation step, typically conducted at a temperature of about 175° C. to 325° C. The mixture 50 of oxidized liquor and gases is cooled by heat exchange in exchangers 46 and 34 and discharged, reused or treated further.

In the embodiment of FIG. 3, as in FIG. 2, the particular heat exchange configuration may differ, depending upon liquor composition. For example, the mixture of liquors and gases from first reactor 36 may be cooled by water 40, or influent liquor 31 in cooler 39 prior to gas-liquid separation, in order to meet possible temperature limitations of pump 44 or to remove excess heat generated in the second reactor 49, for example, which is transferred to the first reactor by heat exchanger 34. Alternatively, separated liquor 43 may be cooled before entering pump 44 by heat exchange with cooling water or influent liquor.

In the embodiments of either FIG. 2 or FIG. 3, the mixture of oxidized liquor and gas from the second reactor may be separated prior to passage through heat exchangers, and either or both streams cooled by separate passage through heat exchangers.

Figure 4:
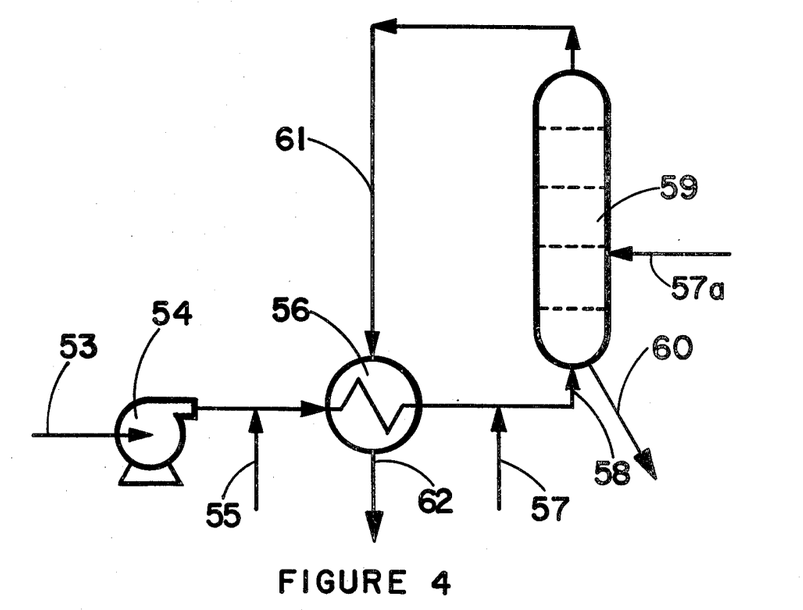
FIG. 4 is a flow schematic of the embodiment incorporating both wet oxidation stages in a single pressure vessel, with removal of sulfur in either the solid or molten state.

In FIG. 4 thiosulfate containing liquor 53 and oxygen, air, or another oxygen containing gas 55 or 57 are preheated and introduced into a multistage reaction vessel 59. In the lower stage or stages, a partial wet oxidation under mild conditions oxidizes a portion of the thiosulfates to sulfuric acid and sulfate and decomposes remaining thiosulfate to sulfite and elemental sulfur. The latter is concentrated in the lower stage of the reactor and discharged as molten or solid sulfur 60. As the liquor passes upward from stage to stage, higher degrees of oxidation occur, releasing additional heat and thereby increasing the temperature. The mixture 61 of oxidized liquor and gases is cooled by heat exchange with incoming liquor or liquor and oxidant.

In some cases a single pump may serve a two-reactor system; the first reactor is operated at a slightly higher pressure than the second reactor. As illustrated in FIG. 5, thiosulfate containing liquors 63 are pumped by high pressure pump 64 to first heat exchanger 66 where the liquors and added oxygen, air, or other oxygen containing gas 65 are together preheated by hot oxidized liquor 82. The resulting mixture 67 undergoes a first wet oxidation of a portion of the thiosulfate to sulfuric acid and sulfate in reactor 68 at a temperature which will result in the formation of elemental sulfur and sulfite from the remaining thiosulfate. Molten or solid sulfur, the particular form being dependent upon the temperature, is settled and continuously or intermittenly removed from oxidized liquor 69 in separator 70 as stream 71. The remaining liquor and gas mixture 72 passes to a separator 73 and is separated into gas 74 and partially oxidized liquid 75. The liquor is further heated in heat exchanger 76 prior to entering second reactor 80. Oxygen, air, or other oxygen containing gas 77 or 78 is added to the liquor, and substantial oxidation of organic matter occurs in the reactor. The mixture 81 of liquor and oxidation gases is passed through heat exchanger 76 to preheat partially oxidized liquor 75 and gas 77, and then passes through heat exchanger 66 to preheat incoming liquor 63, before passing to a further recovery, treatment, or discharge step.

Figure 6:
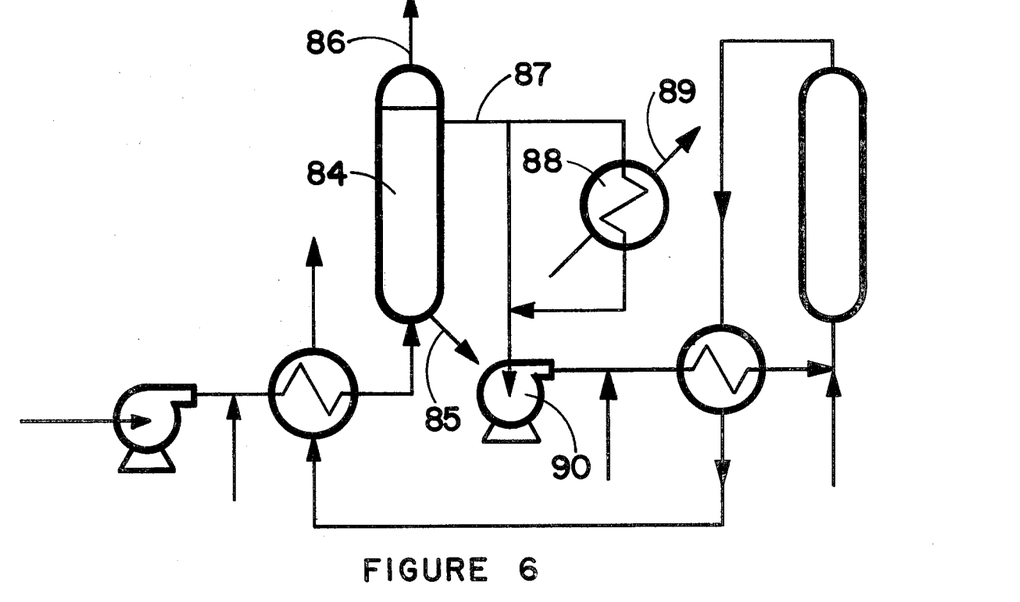
FIG. 6 shows an embodiment whereby gas-liquid separation as well as sulfur concentration and separation are performed in the first of two reactors. No special separation vessels are required.

Separate intermediate separators such as shown in FIGS. 2, 3 and 5 may be eliminated by employing a first stage reactor which serves to separate and concentrate elemental sulfur as well as perform gas-liquid separation. An embodiment of the invention utilizing such a reactor is typified in FIG. 6, which is identical to that of FIG. 3 except that gas-liquid separation is performed in the first reactor 84, resulting in exhaust gas stream 86 and liquid stream 87. Separator 41 of FIG. 3 is thus eliminated. As in the embodiment of FIG. 3, the liquor 87 may be cooled in cooler 88 if necessary to meet maximum temperature limitations of pump 90. Elemental sulfur 85 in solid or molten form is withdrawn continuously or intermittently from the reactor bottom.

Figure 7:
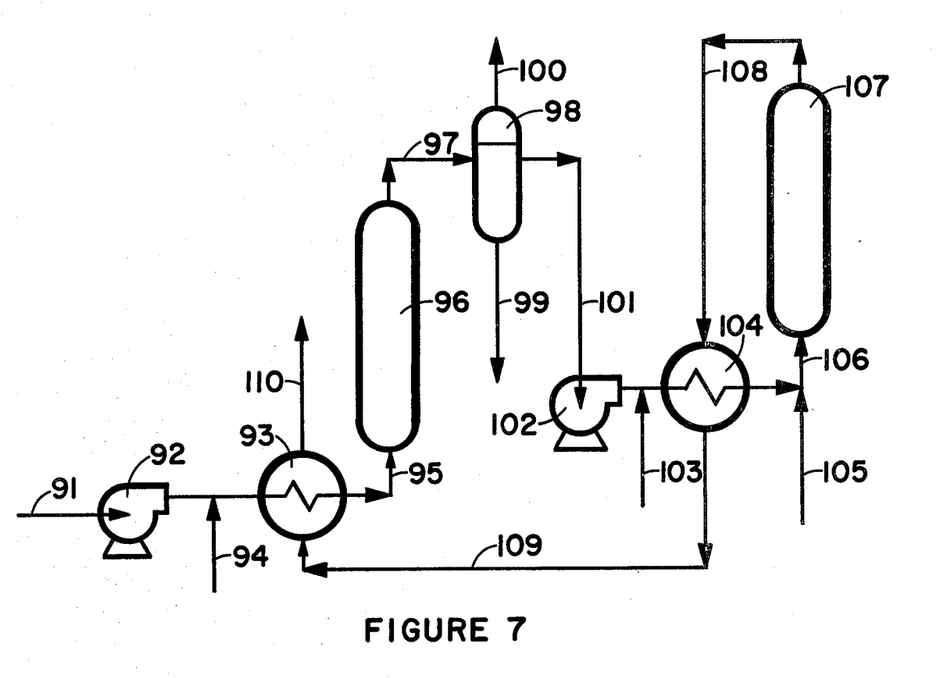
FIG. 7 is a flow schematic of an embodiment where both sulfur separation and removal and vapor-liquid separation are accomplished in a single separator following the first wet oxidation stage.

In the embodiment of FIG. 7, the three-phase mixture 97 of partially oxidized liquor, sulfur and offgases is passed from first stage reactor 96 to separator 98, from which separate streams of sulfur 99, offgases 100 and partially oxidized liquor 101 are discharged.

Figure 8:
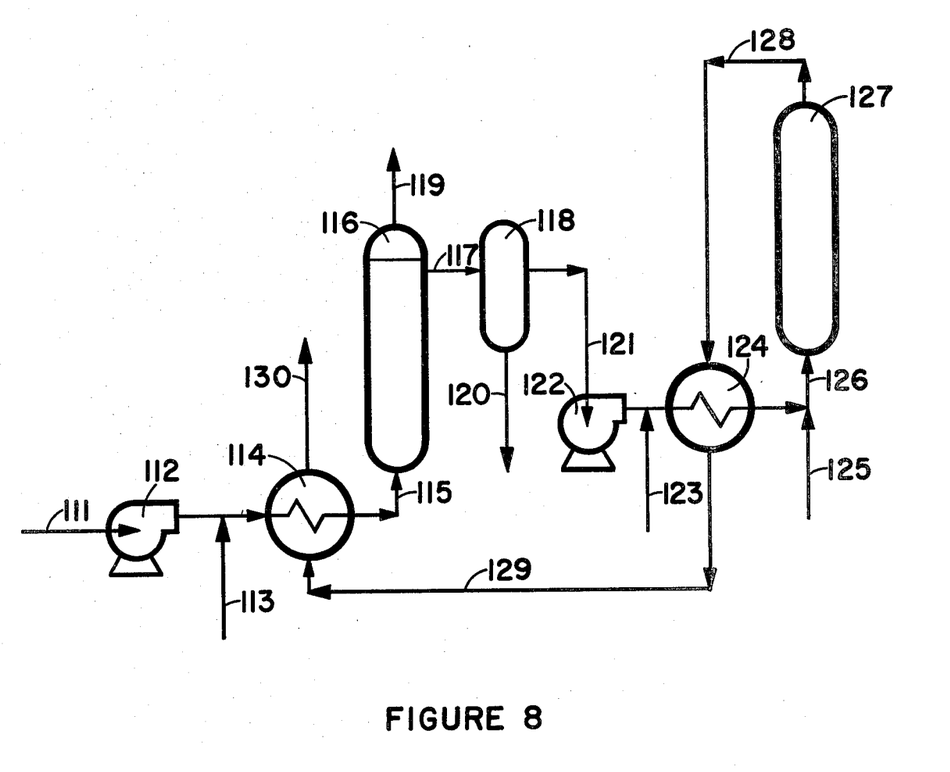
FIG. 8 is a flow schematic of an embodiment showing vapor-liquid separation in the first reactor vessel and separation and removal of sulfur in a subsequent separator vessel.

In the embodiment of FIG. 8, offgases 119 are separated from the liquid-solid phases in the upper portion of the reactor 116 and discharged therefrom. The liquid-solid mixture 117 is passed to separator 118 where sulfur 120 is concentrated and separately discharged. The partially oxidized liquors 121 are passed to the second wet oxidation stage.

Figure 9:
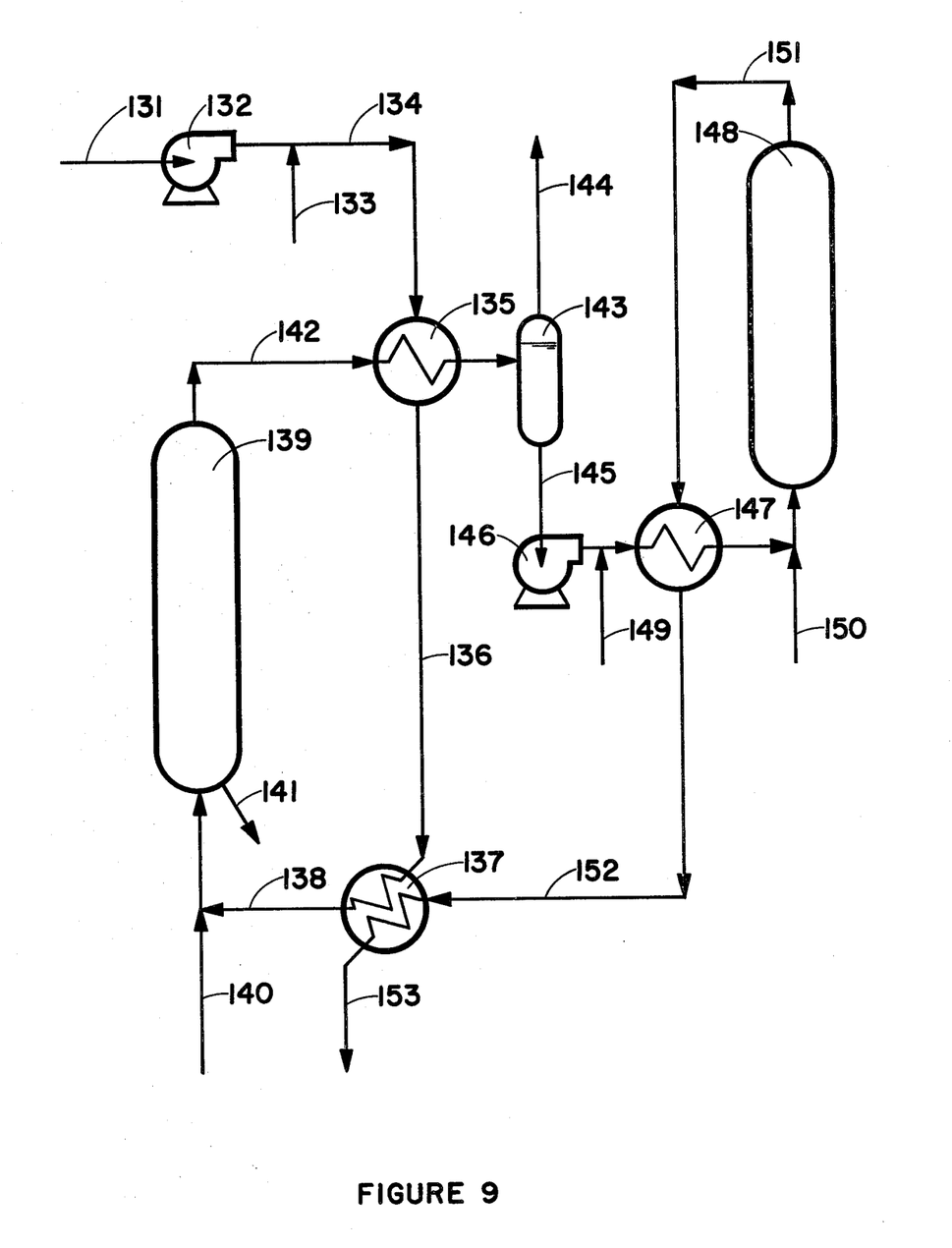
FIG. 9 is a flow schematic of an embodiment in which the thiosulfate containing liquor is preheated in two stages by oxidized liquors from the first and second reactors prior to the first stage of wet oxidation.

A further embodiment of the invention is shown in FIG. 9.

Thiosulfate containing liquor 131 is moved by pump 132 through pipe 134 to first heat exchanger 135, wherein it is heated by the partially oxidized liquor offgas mixture 142 from the first reactor 139. The liquor is then further heated in second heat exchanger 137 by oxidized liquor from the second stage reactor 148. Heated liquors 138 then pass to the first reactor, where elemental sulfur 141 is formed and discharged.

Oxygen, oxygen-containing gas or air is added as stream 133 or 140.

Partially oxidized liquor 142, after cooling and subsequent separation from offgases 144 in separator 143, is pumped through third heat exchanger 147 and heated by hot oxidized liquor 151, and passed to the second stage reactor 148. Oxidizing gas is added before of after heating as stream 149 or 150.

Alternately, and dependent upon the particular operating conditions in the reactors, the oxidized liquor from third heat exchanger 147 is passed through first heat exchanger 135 to heat liquor 134, while partially oxidized liquor-offgas mixture 142 is passed through second heat exchanger 137 to further heat the liquor 136.

Thus the energy flow can be optimized to make the process operate with a minimum of energy input. Where the heating value of the liquor is low, it may be necessary to add further heat to either or both of the reactor stages. Typically this is accomplished by direct steam addition, further heat exchange, or by adding oxidizable materials to the liquor to increase its fuel value.

Where sulfur is discharged from the system in a molten state, it may be subsequently recovered by mixing with water at a temperature below 100° C. to cause solidification, passed through a grinder and pumped as a slurry to storage or to a further purification process. Introduction of the molten sulfur as a stream of droplets into water which is below 100° C. results in the formation of fine sulfur granules.

Alternatively, sulfur in the molten state may be sent directly to either storage or further treatment.

The following example is merely illustrative of the process of the invention; it is in no way exhaustive of the invention or its embodiments.

EXAMPLE

A synthetic COG liquor having the composition shown in Table 1 was preheated to 240° C. and continuously pumped at 24.6 liters per hour into a wet oxidation system comprising a reactor in three stages. Liquor was passed through each reactor stage in series, reaching a maximum temperature of 275° C. in the second stage. Air was continuously injected into the bottom of the first stage and passed upward through each stage; oxidized liquor and gases from the third stage were depressurized from the system pressure of 1400 pounds per square inch (96 Atm.) and cooled to room temperature. The test run was terminated after 24 hours. Blowdown from the first stage was found to contain elemental sulfur equivalent to 41 percent of the thiosulfate sulfur contained in the original liquor. Analysis of effluent from the third stage indicated that 99.7 percent overall COD reduction (excluding sulfur formation) had been performed. The composition of the wet oxidized liquor, corrected for water evaporation following the wet oxidation step, is also shown in Table I. The total oxygen requirement for wet oxidation was reduced by nearly 30 percent as a result of the formation and deposition of elemental sulfur in the first reactor, and its subsequent removal. The savings in quantity of calcium hydroxide required to neutralize the sulfuric acid formed was approximately 16 grams per liter of liquor.

TABLE I
ANALYSIS OF LIQUOR BEFORE AND AFTER TREATMENT

| | Original Liquor | Liquor After Wet Oxidation |
|---|---|---|
| COD, g/l | 48 | 0.12 |
| Total Sulfur, g/l | 36.5 | 29.0 |
| Sulfate Sulfur, g/l | 0.6 | 29.0 |
| Thiosulfate as $S_2O_3^=$, g/l | 29 | 0 |
| Thiocyanate as $SCN^-$, g/l | 29 | 0.3 |
| Sulfide as S, mg/l | <0.035 | <0.035 |
| Ammonia Nitrogen, g/l | 17 | 23 |
| Suspended Solids, g/l | 0.01 | 0.036 |
| pH | 7.7 | 2.4 |

Obviously, many modifications and variations of the invention herein set forth can be made without departing from the scope and spirit thereof, and only the limitations indicated in the appended claims should be imposed.

We claim:

1. A process for treating thiosulfate containing liquors by wet oxidation, comprising the steps of:
   a. subjecting said thiosulfate containing liquors to a first wet oxidation step at a temperature sufficient to oxidize a portion of said thiosulfate to sulfuric acid and sulfate and to decompose remaining thiosulfate to sulfite and elemental sulfur;
   b. concentrating and removing said elemental sulfur from the wet oxidized liquors of step (a); and
   c. subjecting the wet oxidized liquors from step (b) to a second wet oxidation step at a temperature sufficient to achieve substantial destruction of sulfur, organic matter and other oxidizable substances in said liquors.

2. The process according to claim 1, wherein said elemental sulfur is concentrated by settling.

3. The process according to claim 1, wherein the first wet oxidation step is performed at a temperature below the melting point of sulfur, and elemental sulfur is concentrated and removed as a solid suspension in wet oxidized liquor.

4. The process according to claim 1, wherein the first wet oxidation step is performed at a temperature above the melting point of sulfur, and elemental sulfur is concentrated and removed from the wet oxidized liquors in a molten state.

5. The process according to claim 4, wherein the molten sulfur, after concentration and removal from the wet oxidation liquors, is introduced as a stream of droplets into water at a temperature below 100° C. to cause solidification as fine granules.

6. The process according to claim 4, wherein the molten sulfur, after concentration and removal from the wet oxidation liquors, is mixed with water at a temperature below 100° C. to cause solidification and said mixture is passed through a grinding device to produce a slurry of ground sulfur in water.

7. The process according to claim 1, wherein both wet oxidation stages are conducted in a single pressure vessel and elemental sulfur is concentrated and removed from the first wet oxidation stage.

8. The process according to claim 1, in which the first stage wet oxidation stage is conducted at a temperature above 50° C. but below 200° C.

9. The process according to claim 1, in which the second stage wet oxidation is conducted at a temperature above 175° C. but below 375° C.

10. The process according to claim 1, comprising the additional step of separating and removing vapors from the wet oxidation liquors after the first wet oxidation step but before the second wet oxidation step.

11. The process according to claim 1, comprising the further step of cooling the wet oxidized liquors from step (b) to a temperature below 100° C. and pumping said wet oxidized liquors to said second wet oxidation step.

12. The process according to claim 11, wherein said wet oxidized liquors are cooled by heat exchange with said thiosulfate containing liquors passing to said first wet oxidation step.

13. The process according to claim 1, wherein the wet oxidized liquors subjected to the second wet oxidation step contain a maximum of 4 grams per liter of elemental sulfur.

14. The process according to claim 1, in which the thiosulfate containing liquor being treated is coke oven gas scrubber liquor.

* * * * *

UNITED STATES PATENT AND TRADEMARK OFFICE
CERTIFICATE OF CORRECTION

PATENT NO. : 4,372,940
DATED : February 8, 1983
INVENTOR(S) : Bruce L. Brandenburg and Gerald L. Bauer It is certified that error appears in the above-identified patent and that said Letters Patent are hereby corrected as shown below:

Column 2, line 5, "$S_2O_3^-$" should read --$S_2O_3^=$--; line 19, "causes" should read --cause--; line 24, "temperature" should read --temperatures--.

Column 8, line 64, Claim 8, delete "stage", second occurrence.

Signed and Sealed this

Twenty-fourth Day of May 1983

[SEAL]

Attest:

DONALD J. QUIGG

Attesting Officer     Acting Commissioner of Patents and Trademarks